United States Patent [19]

Langan

[11] 4,260,027
[45] Apr. 7, 1981

[54] FLAIL-TYPE MULCHER CULTIVATOR

[75] Inventor: Ervin C. Langan, Atchison, Kans.

[73] Assignee: W.E.F.C.O., Inc., Atchison, Kans.

[21] Appl. No.: 896,777

[22] Filed: Apr. 17, 1978

[51] Int. Cl.³ .................... A01B 33/04; A01B 39/08
[52] U.S. Cl. ...................................... 172/45; 172/60; 172/98; 172/810; 172/121
[58] Field of Search ............... 172/45, 91, 39, 96, 172/57, 60, 650, 121, 655, 123, 98, 297, 303, 552, 553, 276, 476, 690, 456, 310, 311; 56/15.9, 13.6, 294, 249, 6, 7, 504, 12.7

[56] References Cited

U.S. PATENT DOCUMENTS

| | | | |
|---|---|---|---|
| 1,046,564 | 12/1912 | Davis | 172/552 |
| 1,505,572 | 8/1924 | McDonald | 172/45 |
| 1,591,396 | 7/1926 | Mills | 172/552 |
| 1,836,666 | 12/1931 | Katzfey | 172/121 X |
| 1,957,079 | 5/1934 | Ronning | 172/552 |
| 2,233,491 | 3/1941 | Simpson | 172/60 |
| 2,465,405 | 3/1949 | Strawn | 172/552 |
| 2,531,732 | 11/1950 | Hoffman | 172/39 X |
| 2,669,083 | 2/1954 | Hinson | 56/249 X |
| 2,754,740 | 7/1956 | Kirby | 172/297 |
| 3,136,373 | 6/1964 | Bonomo | 172/60 |
| 3,137,350 | 6/1964 | Horr | 172/60 X |
| 3,220,488 | 11/1965 | Becker | 172/543 X |
| 3,263,756 | 8/1966 | Hines | 172/60 |
| 3,704,575 | 12/1972 | Daniel | 56/12.7 |
| 3,841,413 | 10/1974 | Applewhite | 172/311 |
| 4,126,186 | 11/1978 | Lely | 172/552 |

FOREIGN PATENT DOCUMENTS 1007055  2/1952  France ........................... 172/276

Primary Examiner—Richard J. Johnson
Attorney, Agent, or Firm—Schmidt, Johnson, Hovey & Williams

[57] ABSTRACT

A rotatable flail-type agricultural implement is disclosed which includes a central axle and a plurality of radially and circumferentially spaced, flexible, hammer-supporting chains presenting a plurality of ground crop-engaging flails upon rotation of the axle. The axle is preferably composed of a pair of elongated, telescopically interfitted sections, at least one of which is shiftable, such that the effective width of the implement can be varied to accommodate different crop row spacings. In addition, the axle sections include complemental, spiral key and keyway structure for maintaining the flexible hammer chains in a substantially constant, spaced relationship to the central axle, irrespective of variances in the axle length. A V-shaped assembly for mounting the flails on the front of a mobile tractor is also disclosed and includes a pair of diverging arms each including telescopically interfitted sections, such that the transverse or lateral distance between corresponding flails on the separate arms can be varied.

14 Claims, 7 Drawing Figures

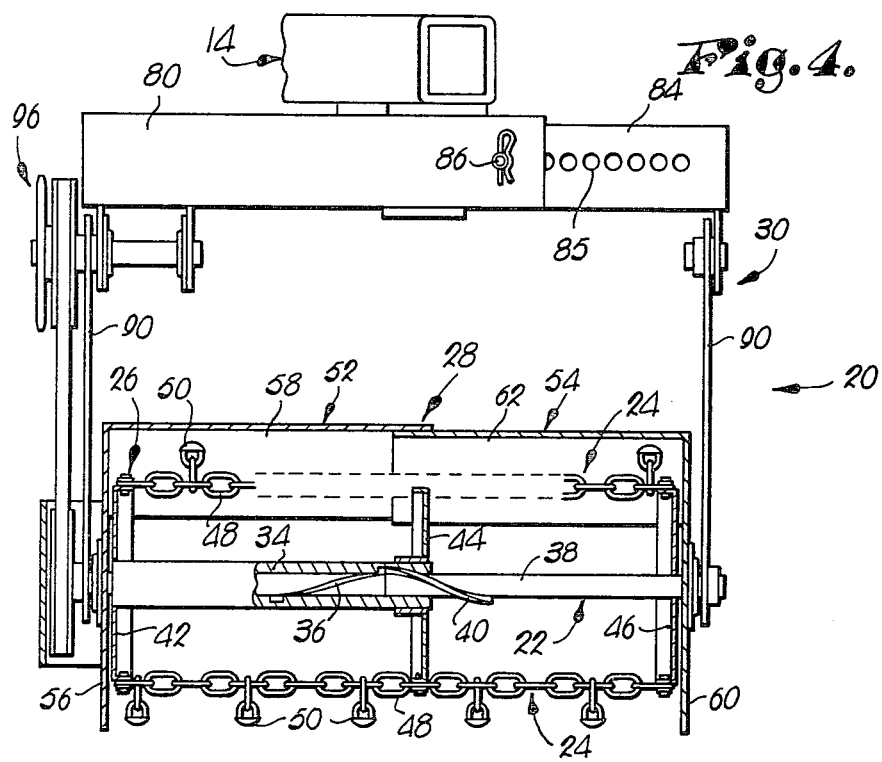
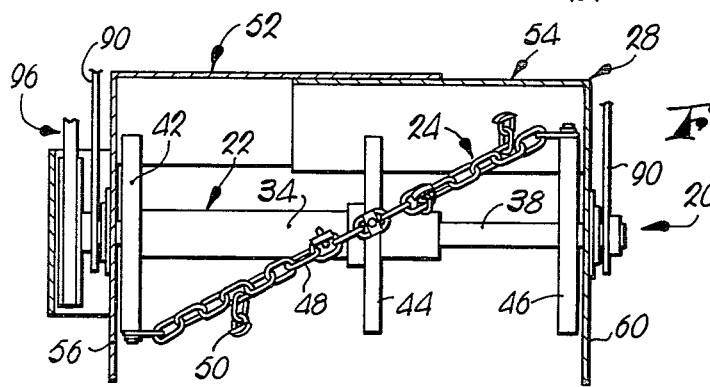
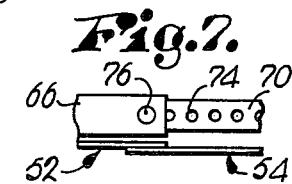
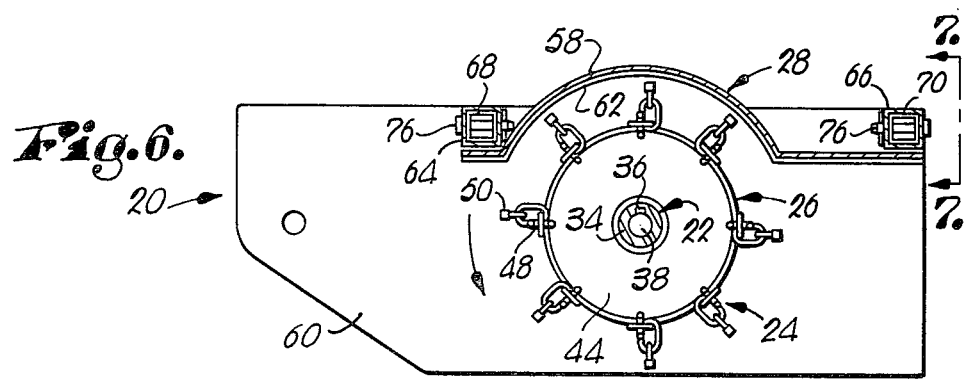

FLAIL-TYPE MULCHER CULTIVATOR

BACKGROUND OF THE INVENTION

1. Field of the Invention

This invention relates to agricultural implements of the flail type which may be used after a crop has been harvested, for the purpose of mulching the remaining ground growth in the field. Also, such equipment can be used between crop rows if desired. More particularly, the invention is concerned with an improved flail-type agricultural implement which in preferred forms includes an elongated, axially rotatable axle and at least one elongated, flexible operating assembly disposed in radially spaced relationship to the axle and rotatable therewith; the axle assembly is also preferably variable in length so as to permit adjustment of the effective width of the unit. The invention also comprehends an adjustable implement assembly adapted for attachment to a mobile tractor or the like which includes a generally V-shaped assembly having a pair of diverging, implement-supporting arms, with each of the arms including at least a pair of telescopically interfitted, axially shiftable sections, along with means for selectively shifting the respective sections in order to alter the transverse or lateral distance between corresponding implements carried by the separate arms.

2. Description of the Prior Art

Various types of flail units have been proposed in the past for mulching or destroying ground growth in fields. One type of flail unit commonly in use provides an elongated, axially rotatable central axle along with a plurality of radially outwardly extending chain-like flailers secured to the axle. Another variety of known flailers includes a central axle and a plurality of radially and circumferentially spaced, rigid elongated members which respectively support a plurality of longitudinally spaced flail hammers. In both of these types of flailers, powered rotation causes the flail ends or hammers to repeatedly strike the ground and thereby mulch or destroy ground growth.

While flailers of the type described have long been in use, a number of unresolved problems remain. For example, if it is desired to mulch between rows of emergent crops, the effective width of the flailer must correspond to the row spacing width, else the crop itself will be destroyed. And, since row widths are variable depending upon the crop in question, it will be readily appreciated that conventional flailers, which cannot be adjusted in their effective widths, cannot be universally employed. Therefore, a flail assembly which can be quickly and easily adjusted to vary the effective width thereof could give a decided advantage.

In addition, a number of mounting assemblies for securing a flailer to a mobile tractor or the like have been proposed. In general however, these mounts have not provided for any adjustment in the lateral or transverse distance between separate, corresponding flailers. This deficiency, in conjunction with that noted above with respect to fixed-width flailers, has rendered it virtually impossible to provide a truly universal flail mechanism usable in virtually any field and with a wide variety of row spacings.

Prior patents of background interest in connection with the present invention include: U.S. Pat. Nos. 1,562,709, 1,576,862, 1,693,475, 1,957,079, 2,465,405, 2,539,934, 2,974,472, 3,624,697, 2,865,135, and 3,884,019.

SUMMARY OF THE INVENTION

In one aspect of the invention, an agricultural implement is provided which includes an elongated, axially rotatable central axle along with at least one (and preferably a plurality of) flexible operating assemblies disposed in spaced relationship to the axle and extending generally along the length thereof. Mounting means are provided for coupling the operating assemblies to the axle for rotation with the latter. Preferably, the implement is a flail type unit and the flexible operating assembly comprises a length of chain having a plurality of spaced flail hammers secured thereto.

In particularly preferred embodiments of the invention, the implement axle comprises a first elongated tubular section and a second elongated section telescoped within the first section, with at least one of the axle sections being longitudinally shiftable relative to the remaining section in order to allow for selective variation of the length of the axle. Conventional locking means are also provided for locking the axle into any one of a number of desired positions. In addition, the implement advantageously includes means for maintaining the flexible operating assembly in a substantially constant, spaced relationship to the axle irrespective of variances in the length of the latter. This relationship-maintaining means preferably includes structure defining a spiral keyway along one of the axle sections, and a complemental spiral key on the remaining axle section which is received within the keyway and shiftable therein. Thus, when the axle sections are shifted to vary the effective width of the implement, the shiftable axle sections traverse a spiral path; this in turn causes the flexible operating assembly to assume a spiral configuration while at the same time maintaining substantially the same radial distance between the axle and the operating assembly without undue sagging or the like.

An adjustable implement assembly adapted for attachment to the front of a mobile tractor is also within the ambit of the invention and preferably includes a generally V-shaped assembly having a pair of diverging, implement-supporting arms, with each of the arms including at least a pair of elongated, telescopically interfitted, axially shiftable sections. The implement assembly mounted on the front of a tractor with the diverging arms thereof extending generally rearwardly such that at least a part of the tractor is located between the arms. The respective sections of the separate assembly arms are axially shiftable such that the transverse or lateral distance between corresponding implements supported by the separate arms can be varied. This in conjunction with the variable width feature of the preferred implements hereof creates an essentially universal implement system which is adaptable to virtually any field condition or crop row spacing.

BRIEF DESCRIPTION OF THE DRAWINGS

FIG. 4 is a fragmentary vertical sectional view with parts broken away for clarity of a flail-type implement in accordance with the invention, shown with the implement in an extended position;

FIG. 5 is an elevational view similar to that of FIG. 4 but illustrates the implement in a lesser width configuration;

FIG. 6 is a sectional view taken along line 6—6 of FIG. 3 which illustrates the internal construction of the flail implement; and FIG. 7 is a fragmentary sectional view taken along line 7—7 of FIG. 6 which illustrates the telescoping portions of the implement guides.

DESCRIPTION OF THE PREFERRED EMBODIMENTS

Figure 1:
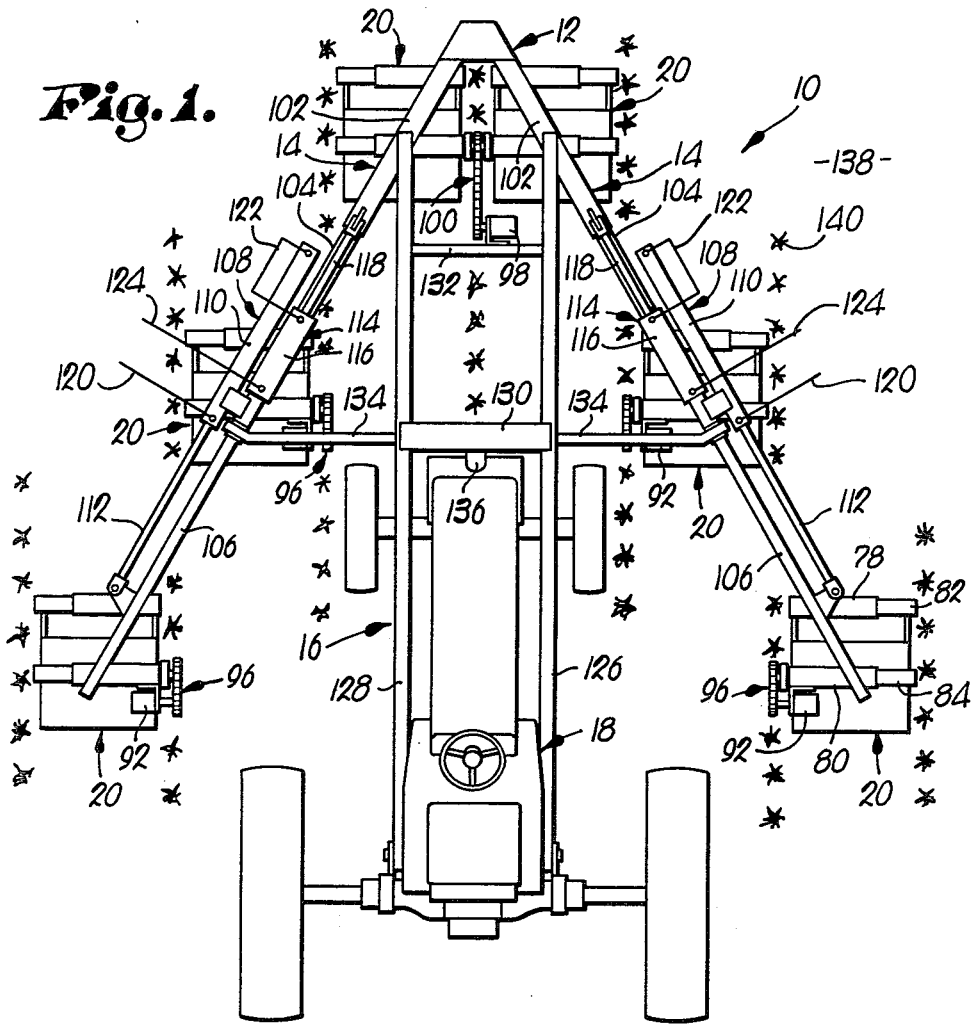
FIG. 1 is a partially schematic plan view of the V-shaped implement assembly of the invention shown mounted on the front of a mobile tractor and supporting a plurality of flail-type implements in accordance with the invention.
Figure 2:
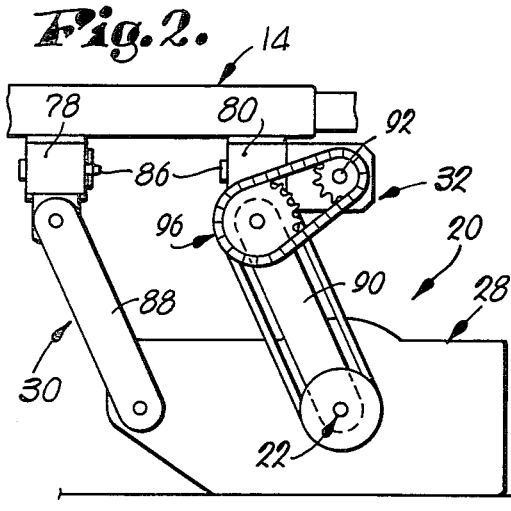
FIG. 2 is a fragmentary side elevational view illustrating the mounting arrangement for one of the flail-typ implements.
Figure 3:
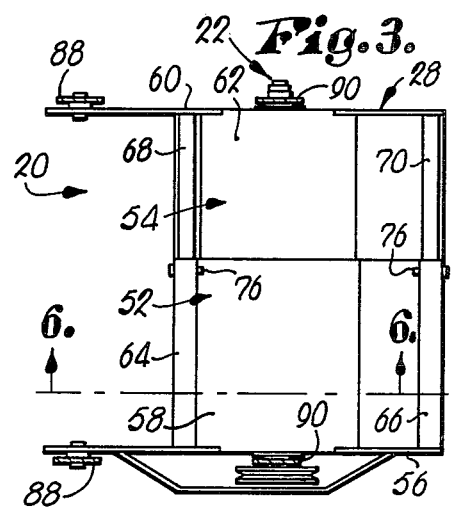
FIG. 3 is a plan view illustrating the housing provided with the flail-type implement hereof.

Turning now to FIG. 1, an overall implement apparatus 10 in accordance with the invention is illustrated in plan. Apparatus 10 includes a generally V-shaped assembly 12 having a pair of diverging, implement-supporting arms 14 and means generally referred to by the numeral 16 for mounting assembly 12 onto the front of a tractor 18. As illustrated, the respective arms 14 extend generally rearwardly such that the front of tractor 18 is disposed between the arms.

A total of six identical flail-type implements 20 are supported by V-assembly 12. As can be seen, two such implements 20 are located in side-by-side relationship adjacent the front of assembly 12, while two additional implements are disposed in spaced relationship along the length of each arm 14.

Referring now specifically to FIGS. 3–7, an exemplary one of the implements 20 will be described in detail. Broadly, each implement 20 includes an elongated, axially rotatable central axle 22, along with a plurality of identical, flexible, operating or flail assemblies 24 which are located in radially spaced relationship to axle 22 and are circumferentially spaced therearound (see FIG. 6). Mounting means 26 is also provided for securing the flail assemblies 24 in this disposition, along with a housing structure 28, means 30 for mounting the implement onto a support arm 14, and drive means generally referred to by the numeral 32 for powered rotation of axle 22.

In more detail, the axle 22 includes an elongated, tubular first axle section 34 which is provided with structure on the interior surface or face thereof defining a spiral keyway 36 in the form of a spiral extending along the length of section 34. A second elongated axle section 38 is telescopically received within the tubular section 34. As best seen in FIG. 4, the section 38 is equipped with an outwardly extending spiral key 40 which is complemental with the keyway 36. As will be explained in more detail hereinafter, key 40 is received within keyway 36 at all times, and allows section 38 to shift relative to section 34 along the spiral path defined by the complemental key and keyway structure.

Mounting means 26 includes a pair of circular plates 42 and 44 which are fixedly secured to the opposed ends of first axle section 34 for rotation therewith. In like manner, a plate 46 is fixedly secured adjacent the outermost end of the section 38. Each flexible flail assembly 24 is preferably in the form of a elongated length of chain 48 having a plurality of flail hammers 50 secured to the chain 48 along the length thereof. As illustrated, the respective assemblies 24 are secured by conventional means to the periphery of the plates 42, 44 and 46 and are circumferentially spaced around these plates. In this manner, the assemblies 24 rotate in unison with the axle 22. Moreover, in extended positions of the implement 20 illustrated in FIG. 4 the respective assemblies 24 are substantially parallel with the axle 22, and are in essentially constant radially spaced relationship from the axle.

Housing structure 28 includes a pair of telescopically interfitted housing members 52 and 54 which are respectively fixed to the outermost ends of the axle sections 34 and 38. The member 52 includes a generally planar sidewall 56 along with a laterally extending, somewhat dome-shaped portion 58. Likewise, the member 54 includes a sidewall 60 and the transversely extending, dome-shaped portion 62 which telescopically interfits with the portion 58 of member 52 (see FIG. 4). The dome-shaped portion 58 and 62 cooperatively define an elongated housing adjacent the operating portion of implement 20 which is so dimensioned as to allow free rotation of the axle and flail assemblies described (see FIG. 6). In addition, the member 52 is provided with a pair of elongated, rectangular tubular guide elements 64 and 66 which are respectively located fore and aft of the arcuate portion of the member 52 and extend transversely therewith. In like manner, the member 54 is provided with a pair of fore and aft complementary guide elements 68 and 70 which are telescopically received within the corresponding larger elements 64, 66. The telescopic guide structure provided by the interfitted elements 64, 68 and 66, 70 is completed by provision of a series of apertures (see FIG. 7) 74 located through the sidewalls of the respective guide elements, along with removable locking pins 76.

Implement mounting means 30 include a pair of elongated, tubular mounts 78 and 80 which are secured to the underside of arm 14 in spaced relationship to one another and generally transversely relative to the longitudinal axis of the arm. In addition, a corresponding pair of apertured mounts 82, 84, are respectively telescoped within the mounts 78, 80, such that the effective width of the mounting structure can be varied. The apertures 85 provided in the interfitted mounts, along with conventional locking pin apparatus 86, serves to permit selective variation in this width.

Mounting means 30 also includes a pair of outermost downwardly extending pivotal legs 88 pivotally secured, respectively, adjacent the outermost ends of the mounts interfitted 78, 82. Likewise a pair of similar downwardly extending pivotal legs 90 are respectively secured adjacent the outermost ends of the interfitted mounts 80, 84. Viewing FIG. 4, it will be seen that the opposite ends of the legs 90 are respectively pivotally secured to the opposed ends of the telescoped axle sections 34, 38. In like manner, the legs 88 are respectively pivotally secured adjacent the forward end of the sidewalls 56, 60 by conventional means.

Drive means 32 preferably include a separate hydraulic motor 92 mounted adjacent the arm 14, along with conventional chain and belt drive assembly 96 operatively coupled between the motor 92 and the axle 22. The motor 92 may be controlled from the tractor 18 by conventional means, and serves to rotate axle 22, and thereby drive implement 20, in the well known manner. A separate hydraulic motor 92 is provided for each of the four implements 20 spaced along the length of the arms 14, while a single motor 98 is employed for driving the leading pair of implements, as seen in FIG. 1. In the latter case, a conventional drive assembly 100 is operatively coupled between motor 98 and the pair of implements 20 driven thereby.

V-shaped mounting assembly 12, as noted above, preferably includes a pair of diverging arms 14 which are interconnected at the forward end of the assembly 12. Each arm 14 includes three telescopically interfitted sections 102, 104, and 106. The respective arm sections are shiftable relative to one another, and this motion is preferably controllable from tractor 18. For example, in one embodiment, a double acting piston and cylinder assembly 108 is provided, with the cylinder 110 being secured to intermediate section 104, while the end of rod 112 thereof is secured to the arm section 106. A second double acting piston and cylinder assembly 114 is likewise provided, with cylinder 116 being secured to intermediate arm section 104, and the outermost end of rod 118 is coupled to arm section 102. As will be readily appreciated, when it is desired to retract the arm 14, pressurized hydraulic fluid is directed through line 120 which serves to retract rod 112. At the same time, hydraulic fluid is exhausted from cylinder 110 through line 122 in order to drive cylinder 160 and thus retract the rod 118. Of course, extension of the arm 14 is accomplished by a reversal of the above, with pressurized fluid being directed to cylinder 116 via line 124.

Although assembly 12 can be mounted on the front of a tractor 18 by any number of means, in the illustrated embodiment a pair of elongated pivotal supports 126, 128 are coupled to tractor 18 adjacent the rear axle thereof and extend forwardly for connection to the respective arms 14 (see FIG. 1). In addition, a pair of cross braces 130 and 132 are provided to rigidify the arms 126, 128. A pair of laterally extending support arms 134 extend between the supports 126, 128 and the adjacent arm 14 to provide further stability. A conventional piston and cylinder assembly 136 is located adjacent the front of tractor 18 and is operatively connected to the described mounting structure for the purpose of elevating and lowering the same as desired.

The operation of the apparatus will now be described. First of all, a situation will be considered wherein the respective implements 20 are in a relatively wide, extended position (see FIG. 4) in order to accommodate wide row spacings of this size. Also the arms 14 are extended appropriately in order to ensure that the implements 20 traverse the rows properly without damage to the growing crop. In this configuration it is only necessary for the operator to advance through the field 138 (see FIG. 1) between the crop rows 140 while the respective implements 20 are powered and in operation. This operation includes powered rotation of the operating portions of each of the axle and flail assemblies, in order to mulch or destroy unwanted ground growth between the crop rows. The high speed rotation of the respective chain and hammer assembly is extremely effective for this purpose as the chains and hammers repeatedly strike the ground growth between the crop rows. Moreover, the fact that the implements 20 precede tractor 18 through the field is an advantage, since if the implements trailed the tractor the latter could have a tendency to tamp down the unwanted ground growth and prevent the most effective mulching thereof.

When it is desired to alter the implement assembly 10 in order to use the same in a field having smaller row spacings, the following procedure is followed. First, the respective implements 20 are shortened in effective width by shifting axle section 38 into axle section 34. This is accomplished by removing the pins 76 and apparatus 86, followed by shifting of the housing member 54 inwardly relative to housing member 52, along with the interfitted mounts secured to the arms 14, and the guides secured to the housing. This shifting of the entire housing and mounting assembly in turn causes the axle section 38 to shift relative to section 34. By virtue of the complemental key and keyway structure above described, this shifting can only occur in a spiral manner such that the respective chain and hammer assemblies 48, 50 thereby assume a spiral orientation in accordance with the shifting of section 38. One selected operating position of unit 20 is illustrated in FIG. 5 wherein the depicted flail assembly assumes this configuration. The final step involved in this adjustment of the implements 20 is to reinstall the locking pins 76 and apparatus 86, in order to securely lock the apparatus 20 in its new orientation.

After all of the implements 20 have been altered in effective width, it may be necessary to shift the supporting arms 14 in order to alter the lateral or transverse distance between corresponding implements on each arm 14. This is accomplished by actuation of the hydraulic assembly provided with the arms 14, as described. Thus, by a combination of adjustment of the implements 20 as to their effective widths, and alteration of the lengths of the respective arms 14, it is possible to accommodate virtually any normal row spacing or field configuration, such that the implement assembly hereof provides advantages heretofore unobtainable with prior units.

It should also be recognized that the spiral key and keyway arrangement serves to maintain the flexible chain and hammer assemblies in a substantially constant, spaced relationship to the corresponding axles irrespective of variances in the lengths of the latter. That is to say, because the axle sections shift in a spiral fashion relative to one another, and the chain and hammer assemblies correspondingly assume a somewhat wound or spiral configuration, undesirable excessive sag or play in the chain and hammer assemblies is avoided. As can be appreciated, without some means of maintaining the desired relationship of the chains, it is possible that the latter could become entangled during operation or repeatedly strike the surrounding housing. With the present invention however, this is completely avoided.

It will also be recognized that a number of variations can be made in the embodiment specifically described herein without departing from the spirit and scope of the invention. For example, hydraulic means could be provided for assisting in alteration of the effective widths of the implements 20, and other acceptable mounting and drive assemblies could be provided. Such variations are of course within the ambit of the invention, and therefore it should be understood that the embodiments specifically described herein are illustrative in nature and do not constitute a limitation upon the invention.

I claim:

1. An agricultural implement comprising:
   an elongated, axially rotatable axle including a first elongated tubular axle section, and a second elongated axle section telescoped within said first section, at least one of said axle sections being longitudinally shiftable relative to the other section for selective variation of the length of said axle;

respective mounting structures secured adjacent the opposite ends of said first and second sections and extending radially outwardly therefrom;

at least one elongated, flexible operating assembly disposed in spaced relationship to said axle, extending generally along the length thereof, and of length to span the distance between said mounting structures;

means mounting said operating assembly to said mounting structures in said relationship for rotation with said axle; and means for maintaining said flexible operating assembly in a substantially constant, spaced relationship to said axle irrespective of variances in the length of the axle.

2. The implement as set forth in claim 1 wherein said flexible operating assembly comprises a length of chain, and a plurality of spaced flail hammers secured to said chain.

3. The implement as set forth in claim 1 including means for locking said one axle section at any one of a number of positions relative to said other section.

4. The implement as set forth in claim 1 wherein said relationship-maintaining means includes structure defining a spiral keyway along one of said axle sections, and a complemental spiral key on the other of said axle sections which is received within said keyway and is shiftable therein.

5. The implement as set forth in claim 1 wherein said flexible operating assembly is maintained at a substantially constant radial distance from said axle throughout the length of the axle.

6. The implement as set forth in claim 1 wherein said assembly-supporting means includes structure adjacent the ends of said axle and extending radially therefrom, and means coupling said assembly to said radially extending structure.

7. The implement as set forth in claim 1 including means for mounting said implement onto a tractor, and motor means for rotating said axle.

8. An adjustable implement assembly adapted for attachment to a mobile tractor or the like, comprising:

a generally V-shaped assembly including a pair of diverging, implement-supporting arms, each of said arms including at least a pair of elongated, telescopically interfitted, axially shiftable sections;

means for mounting said assembly onto the front of said mobile tractor with the tractor located at least partially between said arms;

at least one agricultural implement mounted on each arm in a ground-engaging work position;

means for selectively axially shifting respective sections of said arms for altering the lateral distance between the implements on each arm while maintaining said implements in a ground-engaging work position in order to allow said assembly to traverse and work different agricultural fields having different row width configurations; and motive means for driving said implements, including structure for operating each of said implements at different axially shifted positions of said arms for permitting use of said implement assembly in said different row width configurations.

9. The implement assembly as set forth in claim 8 wherein said implements comprise ground crop-engaging flail mechanisms, each of said mechanisms including structure for selectively varying the effective width of the flail mechanism.

10. The implement assembly as set forth in claim 9 wherein each implement comprises:

elongated, axially rotatable axle including a first elongated tubular axle section, and a second elongated axle section telescoped within said first section, at least one of said axle sections being longitudinally shiftable relative to the other section for selective variation of the length of said axle;

at least one elongated, flexible flail assembly disposed in spaced relationship to said axle and extending generally along the length thereof;

means mounting said flail assembly in said relationship for rotation with said axle; and means for maintaining said flexible flail assembly in a substantially constant spaced relationship to said axle irrespective of variances in the length of said axle.

11. An agricultural implement comprising:

an elongated, axially rotatable axle including a first elongated tubular axle section, and a second elongated axle section telescoped within said first section, at least one of said axle sections being longitudinally shiftable relative to the other section for selective variation of the length of said axle;

at least one elongated, flexible operating assembly disposed in spaced relationship to said axle and extending generally along the length thereof;

means mounting said operating assembly in said relationship for rotation with said axle; and means for maintaining said flexible operating assembly in a substantially constant, spaced relationship to said axle irrespective of variances in the length of the axle.

said relationship-maintaining means including structure defining a spiral keyway along one of said axle sections, and a complemental spiral key on the other of said axle sections which is received within said keyway and is shiftable therein.

12. An agricultural implement adapted to be advanced through a field comprising:

an elongated, axially rotatable axle including structure for selectively varying the length of the axle;

at least one operating assembly operably secured to and rotatable with said axle including an elongated flexible member located in spaced relationship to said axle and disposed generally along the length thereof; and means for maintaining said member in a substantially constant, spaced relationship to said axle irrespective of variances in the length of the axle, said relationship-maintaining means including structure defining a spiral keyway along one of said axle sections, and a complemental spiral key on the other of said axle sections which is received within said keyway and is shiftable therein, said axle being of variable length for correspondingly varying the effective width of said implement.

13. An adjustable implement assembly adapted for attachment to a mobile tractor or the like, comprising:

a generally V-shaped assembly including a pair of diverging implement-supporting arms, each of said arms including at least a pair of elongated, telescopically interfitted, axially shiftable sections;

means for mounting said assembly onto the front of said mobile tractor with the tractor located at least partially between said arms, at least one agricultural implement mounted on each arm, said at least one implement comprising a ground crop-engaging flail mechanism including structure for selectively varying the effective width of the flail mechanism;

means for selectively axially shifting respective sections of said arms for altering the lateral distance between the implements on each arm; and motive means for driving said implements.

14. An agricultural implement, comprising:

an elongated, axially rotatable axle including a first elongated tubular axle section, and a second elongated axle section telescoped within said first section, at least one of said axle sections being longitudinally shiftable relative to the other section for selective variation of the length of said axle;

at least one elongated, flexible operating assembly disposed in spaced relationship to said axle and extending generally along the length thereof, said assembly comprising a length of chain, and a plurality of spaced flail hammers secured to said chain;

means mounting said operating assembly in said relationship for rotation with said axle; and means for maintaining said flexible operating assembly in substantially constant, spaced relationship to said axle irrespective of variances in the length of the axle.

* * * * *